Nov. 24, 1942.   G. B. WATKINS ET AL   2,303,151
PROCESS OF PRODUCING LAMINATED GLASS STRUCTURES
Filed Oct. 9, 1941

Inventors
GEORGE B. WATKINS
JAMES H. BOICEY
By Frank Fraser
Attorney

Patented Nov. 24, 1942

2,303,151

UNITED STATES PATENT OFFICE 2,303,151

PROCESS OF PRODUCING LAMINATED GLASS STRUCTURES

George B. Watkins and James H. Boicey, Toledo, Ohio, assignors to Libbey-Owens-Ford Glass Company, Toledo, Ohio, a corporation of Ohio Application October 9, 1941, Serial No. 414,310

4 Claims. (Cl. 49—81)

The present invention relates to an improved process of producing laminated glass structures.

Although the laminated structure herein provided is not restricted to any particular use, it has been primarily designed for and is of utility in glazing openings in airplanes and other aircraft where the requirements are unusually stringent.

The laminated glass structure to which this invention more particularly relates is of a type comprising two sheets of glass and an interposed layer of thermoplastic adherent thereto, the area of the plastic interlayer being greater than the area of the glass sheets so that it extends beyond the edges of said sheets to provide an attaching flange.

This type of extended plastic-laminated glass is adapted to be mounted in the opening to be glazed by clamping the extended portion of the plastic in or upon the supporting frame as distinguished from clamping the marginal portions of the glass sheets. By clamping the flexible plastic attaching flange only, the laminated structure has a certain resiliency or freedom of movement relative to the supporting frame in or upon which it is mounted, whereby torsion and shock to which the airplane may be subjected will be "cushioned" and for all practical purposes will not be transmitted directly to the glass, thus reducing or eliminating the tendency of cracking or shattering thereof from such cause. Otherwise stated, by so mounting the laminated structure, it is possible to get the benefit of the resiliency or ability to give on the part of the plastic so that when the plane is in flight and twists, weaves or is subjected to varied pressure differentials, the glass will not tend to break because of its ability to "float" without introduction of localized strains.

There is another advantage in this type of laminated glass structure, particularly when used in airplanes, in that the structure can be mounted in or upon a supporting frame with the outer face of the structure made flush with the outer surface of said frame so as not to interfere with streamlined surfaces or tend to increase wind resistance.

Heretofore, one way of making this type of laminated structure has been to assemble the glass and plastic laminations to be joined and place them in a rubber bag or other flexible container from which the air is exhausted. The flexible container and its contents were then placed in an autoclave and subjected to the action of a heated fluid under pressure. The glass sheets were initially cut relatively smaller than the plastic interlayer so that when the laminations were assembled and placed in the flexible container, the plastic would extend beyond the edges of the glass sheets approximately one inch. This method is not however entirely satisfactory because of the tendency of the flexible container to pinch the edges of the extended plastic during pressing in the autoclave and thereby cause a tapering of said edges which is an objectional feature, particularly when it comes to mounting the structure. In addition, the rubber bags used are quite expensive and their period of useful service relatively short. Furthermore, considerable time and labor is expended in placing the assembled glass-plastic laminations in the rubber bags and removing them therefrom.

This invention has to do with the provision of an improved process of fabricating a laminated structure of the above character whereby the use of rubber bags or other flexible containers can be eliminated, and being further characterized by the advantage that the extended portion of the plastic interlayer is effectively protected against deformation during pressing of the laminations in the autoclave to the end that pinching of the edges of the plastic resulting in a tapering or thinning thereof is effectually prevented.

Briefly stated, in accordance with the present invention, the glass sheets and plastic interlayer are initially of substantially the same size and are associated with one another in the usual manner. However, during assembly of the glass and plastic, a relatively thin layer of a suitable cellulosic material, such as for example cellulose acetate or Cellophane, is interposed between each glass sheet and the plastic interlayer around the marginal portions thereof. The assembled laminations are then subjected to a relatively light initial or preliminary pressing, such as in a platen press, and then placed unprotected in the autoclave and subjected to the direct action of fluid under pressure to effect the final compositing of the laminations. After compositing, the marginal or border portions of the glass sheets are removed together with the cellulosic material, leaving the plastic interlayer extending the desired distance beyond the edges of the glass sheets. By initially cutting the glass sheets the same size as the plastic interlayer, the edge portions of the plastic are protected by the glass during pressing in the autoclave so that pinching and thinning of the edges of the plastic is avoided. The cellulosic material arranged between the glass and plastic serves to prevent the plastic from adhering to the border portions of the glass sheets during the pressure treatment Other objects and advantages of the invention will become more apparent during the course of the following description when taken in connection with the accompanying drawing.

In the drawing wherein like numerals are employed to designate like parts throughout the same:

Figure 1:
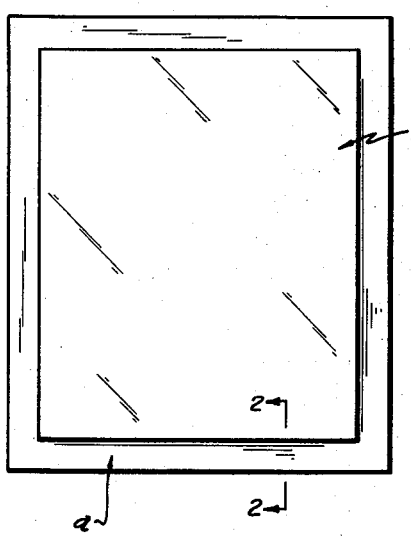
Fig. 1 is a face view of a laminated glass structure made in accordance with the invention.
Figure 2:
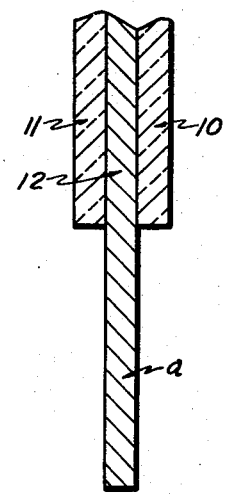
Fig. 2 is a transverse section therethrough taken on line 2—2 of Fig. 1.

With reference now to the drawing, the laminated structure comprises the two sheets of glass 10 and 11 and an interposed layer of thermoplastic 12 bonded to the glass sheets to provide a unitary structure. It will be noted that the area of the glass sheets (Figs. 1, 2 and 3) is relatively less than the area of the plastic interlayer so that the plastic extends beyond the edges of the glass sheets as indicated at a and which extended portion constitutes an attaching flange by which the structure may be mounted in or upon a supporting frame.

The plastic interlayer 12 may be formed of a polyvinyl acetal resin and one such resin which has been used is polyvinyl butyr acetal resin plasticized with 37½ parts dibutyl sebacate per 100 parts of resin by weight. However, different plastics varying in thickness and physical characteristics may be employed as the invention is not limited to the use of any particular resin, class of resins, cellulosic derivatives or the like. In selecting the glass and plastic, however, consideration may well be given to the use to which the finished structure is to be put. In some installations, the structure will be subjected to greater pressure differentials than others, and likewise by proper selection of glass and plastic varying degrees of resistance to bullet penetration can be had.

Figure 5:
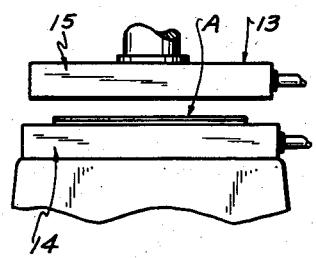
Fig. 5 is a diagrammatic representation of a platen press in which the assembled laminations may be subjected to a relatively light or initial pressure treatment.

The polyvinyl acetal resins, when suitably plasticized, have the capacity of being bonded directly to the cleaned glass sheets upon the application of heat and pressure without the employment of any intermediate layers of adhesive or the like. The plastic interlayer 12 is placed between the glass sheets 10 and 11 to form a "sandwich" and subjected first to a relatively light initial or preliminary pressing such as in a platen press (Fig. 5). The assembled laminations are designated by the letter A and are positioned between the stationary and movable platens 14 and 15 of the press 13. A satisfactory prepressing cycle in the platen press is a temperature of 250 degrees Fahrenheit for four minutes using a pressure of 50 pounds per square inch calculated on the glass surface, although this prepressing cycle can be varied as desired depending upon the type of plastic used.

As an alternative preliminary pressing apparatus, the glass-plastic assembly or sandwich can be passed between one or a plurality of pairs of nipping rolls of yieldable, compressible material such as rubber, rubber composition, or the like. In this case, the sandwich may be heated slightly and then passed between the nipping rolls to exclude air and to give temporary adhesion to keep the glass-plastic laminations in proper alignment.

Figure 6:
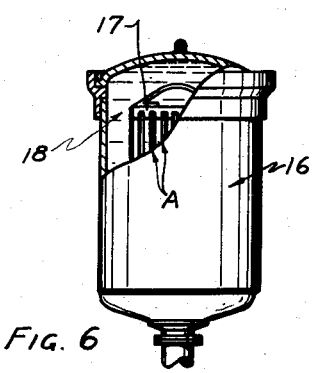
Fig. 6 is an elevation, partially in section, of an autoclave within which the laminations are subjected to final compositing.

Following the preliminary pressing operation, the sandwich is placed unprotected in an autoclave designated in its entirety by the numeral 16 in Fig. 6. As shown, a plurality of the sandwiches A may be supported in spaced relation on a rack 17 within the autoclave. A suitable heated fluid 18 is used in the autoclave to heat the sandwiches and apply the desired pressure thereto. In the autoclave, the glass may be subjected, by way of example, to a pressure of about 225 pounds per square inch at a temperature of 260 degrees Fahrenheit for a period of approximately fifteen minutes. It is preferred that the laminations be cooled in the autoclave under pressure.

As pointed out above, it has been heretofore customary to initially cut the glass sheets relatively smaller than the plastic interlayer so that when associated therewith the plastic would project beyond the edges of said sheets approximately one inch. The glass-plastic assembly was then placed in a rubber bag or other flexible container from which air was exhausted and the bag and its contents placed in an autoclave and subjected to the desired pressure treatment. However, upon being pressed, the action of the flexible container would result in a pinching of the extended portion of the plastic interlayer, resulting in the tapering thereof which is highly objectionable.

Figure 4:
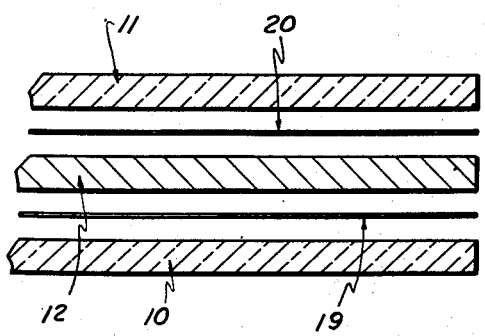
Fig. 4 is a diagrammatic sectional view showing the several laminations to be joined in properly assembled relation with respect to one another but spaced for the sake of clearness.

In carrying out the present invention, the two sheets of glass 10 and 11 are initially of substantially the same size as the plastic interlayer 12 as shown in Fig. 4. The glass and plastic sheets are then assembled with one another in the usual manner to form a sandwich which is subjected first to a relatively light initial or preliminary pressing in the platen press 13 and then to final compositing in the autoclave 16. In order to prevent adherence between the marginal or border portions of the plastic interlayer 12, which is to form the attaching flange a, there is disposed between the plastic interlayer 12 and glass sheets 10 and 11 thin strips 19 and 20 respectively of a cellulosic material such as cellulose acetate or Cellophane. These strips are preferably approximately one inch wide and from .001 to .005 of an inch thick. During the pressure treatments, first in the platen press 13 and then in the autoclave 16, the thin strips 19 and 20 of cellulose material will prevent the marginal or border portions of the plastic interlayer from adhering to the glass sheets.

Figure 7:
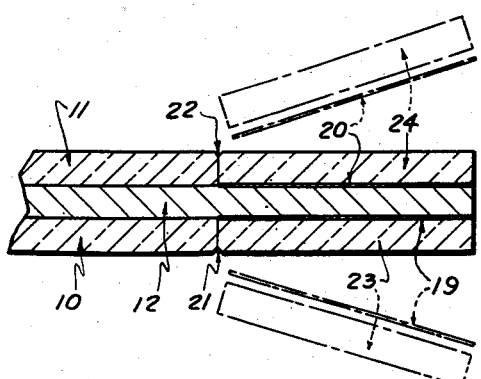
Fig. 7 is a transverse section through the laminated structure after final compositing and showing the removal of the border portions of the glass sheets.

After the laminated structure is removed from the autoclave, the outer surfaces of the two sheets of glass 10 and 11 are scored as at 21 and 22 and these score lines are in alignment with one another and also with the inner edges of the strips 19 and 20. After scoring, the glass sheets are cracked along the score lines 21 and 22 and the border portions 23 and 24 thereof removed as indicated by the broken lines in Fig. 7. The strips 19 and 20 are of course also removed, leaving the marginal portion a of the plastic interlayer extending beyond the edges of the glass sheets 10 and 11.

By using glass sheets which are initially of the same size as the plastic interlayer, the glass serves to protect the border portions of the plastic during pressing and prevent deformation thereof. By having the glass at opposite sides of the plastic during pressing, the liability of pinching of the outer edges of the plastic interlayer and the resultant tapering or thinning thereof is minimized so that the attaching flange a will be of a substantially uniform thickness. In addition, the use of expensive rubber bags or other flexible containers is eliminated as the assembly, after being initially prepressed in the platen press, can be placed unprotected in the autoclave.

The finished laminated structure may be mounted by clamping the extended portion a of the plastic interlayer 12 in a frame 25 (Fig. 3) and which will be herein described as forming part of an airplane, although it may obviously constitute a part of any window or windshield construction. The skin of the plane is designated by the numeral 26 and the plastic attaching flange a overlaps the inner surface of the skin and is clamped thereagainst by plates 27 secured in place by screws, bolts, or other suitable fastening elements 28. As illustrated, the screws 28 do not pass through the plastic attaching flange a but the plastic itself may be perforated to allow passage of the fastening elements therethrough. As shown, a relatively small gap or space 29 is left between the peripheral edges of the laminated structure and the inner edges of the supporting frame to permit the desired freedom of movement of the laminated structure relative to the frame without binding.

Since the plastic attaching flange a only is clamped in the frame 25, it will be apparent that the laminated structure will be permitted a certain amount of floating movement to and fro in the opening due to the resiliency or yieldability of the plastic. Because of this, the liability of breaking or shattering of the glass resulting from a weaving and twisting of the ship proper will be minimized.

This type of laminated structure is also suitable for use in glazing stratosphere planes in which pressurized cabins are provided to obviate the necessity for each occupant of the plane having an individual oxygen supply. When the structure is glazed in a stratosphere plane where a difference in pressure exists between one side and the other of the unit, the said unit will act to not only withstand the differential in pressure on the inside as compared to the outside, but will also provide a tight flexible mounting so that the pressure differential may be effectually maintained.

Figure 3:
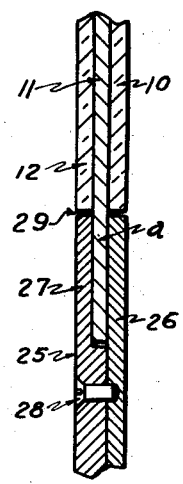
Fig. 3 is a transverse section through the laminated structure and mounting therefor.

Another feature of this type of structure and mounting therefor is that there is provided a so-called "flush" type of installation which is of particular advantage when used in airplanes. Thus, as shown in Fig 3, the outer surface of the outer glass sheet 10 is flush with the outer surface of the skin 26 of the plane so as not to break the streamlined surfaces of the plane whereby wind resistance is materially reduced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The process of making a laminated glass structure including two sheets of glass and an interposed layer of thermoplastic adherent thereto and in which the plastic interlayer extends beyond the edges of the glass sheets to provide a flexible attaching flange, comprising assembling two sheets of glass and an interposed layer of plastic having substantially the same area, subjecting the assembled laminations to heat and pressure to effect the uniting thereof to provide a unitary structure, and then removing the border portions of the glass sheets to leave an exposed margin of plastic extending beyond the edges of said glass sheets.

2. The process of making a laminated glass structure including two sheets of glass and an interposed layer of thermoplastic adherent thereto and in which the plastic interlayer extends beyond the edges of the glass sheets to provide a flexible attaching flange, comprising assembling two sheets of glass and an interposed layer of plastic having substantially the same area, arranging between each glass sheet and the plastic interlayer around the border portions thereof a material which will prevent adhesion between the glass and plastic, subjecting the assembled laminations to heat and pressure to unite the body portions thereof to provide a unitary structure, and then removing the border portions of the glass sheets to leave the marginal portion of the plastic interlayer extending beyond the edges of said sheets.

3. The process of making a laminated glass structure including two sheets of glass and an interposed layer of thermoplastic adherent thereto and in which the plastic interlayer extends beyond the edges of the glass sheets to provide a flexible attaching flange, comprising assembling two sheets of glass and an interposed layer of plastic of substantially the same size, interposing a cellulosic material between each sheet of glass and the plastic interlayer around the border portions thereof, subjecting the assembled laminations to heat and pressure to unite the body portions thereof to provide a unitary structure, and then removing the border portions of the glass sheets and the cellulosic material to leave the marginal portion of the plastic interlayer extending beyond the edges of said sheets.

4. The process of making a laminated glass structure including two sheets of glass and an interposed layer of thermoplastic adherent thereto and in which the plastic interlayer extends beyond the edges of the glass sheets to provide a flexible attaching flange, comprising assembling two sheets of glass and an interposed layer of a resin plastic of substantially the same size, interposing a cellulosic material between each sheet of glass and the plastic interlayer around the border portions thereof, subjecting the assembled laminations first to a relatively light initial pressing treatment and then submerging the prepressed assembly unprotected in an autoclave and subjecting it to the direct action of a heated fluid under pressure, and then removing the border portions of the glass sheets and the cellulosic material to leave the marginal portion of the resin plastic interlayer extending beyond the edges of said sheets.

GEORGE B. WATKINS.
JAMES H. BOICEY.